United States Patent
Billoue et al.

(10) Patent No.: US 6,302,064 B1
(45) Date of Patent: Oct. 16, 2001

(54) STEAM GENERATOR COMPRISING A FLOW DISTRIBUTION BAFFLE

(75) Inventors: Jean-Paul Billoue, Chapet; Bernard Cornu, Les Clayes-Sous-Bois; Daniel Destre, Aulnay-sous-Bois, all of (FR)

(73) Assignee: Framatome, Courbevoie (FR)

( * ) Notice: Subject to any disclaimer, the term of this patent is extended or adjusted under 35 U.S.C. 154(b) by 0 days.

(21) Appl. No.: 09/680,330

(22) Filed: Oct. 6, 2000

(30) Foreign Application Priority Data

Oct. 8, 1999 (FR) .................................................. 99 12584

(51) Int. Cl.[7] .................................................. F22B 37/20
(52) U.S. Cl. ........................... 122/491; 122/488; 122/379
(58) Field of Search .................................. 122/459, 467, 122/448.4, 491, 493, 503, 508, 379, 1 B, 460, 488, DIG. 3

(56) References Cited

U.S. PATENT DOCUMENTS

| | | | | |
|---|---|---|---|---|
| 3,937,183 | * | 2/1976 | Reisacher ............................. | 122/491 |
| 4,665,866 | * | 5/1987 | Wepfer ................................. | 122/493 |
| 4,989,550 | * | 2/1991 | Sterk ..................................... | 122/383 |
| 5,092,280 | * | 3/1992 | Franklin et al. ..................... | 122/379 |

FOREIGN PATENT DOCUMENTS 2243402   4/1974   (DE) .
2597577   10/1987   (FR) .

* cited by examiner

*Primary Examiner*—Gregory Wilson
(74) *Attorney, Agent, or Firm*—Connolly Bove Lodge & Hutz

(57) ABSTRACT

The flow distribution baffle (14) is placed inside the bundle wrapper (7) of the steam generator, at its lower part,-near the steam generator tube plate. Passing through the flow distribution baffle (14) are openings (17, 18) for the passage of tubes of the steam generator bundle and feedwater. The flow distribution baffle (14) comprises a central zone (15) of more or less circular shape with, as its axis, the axis of the steam generator and a radius ($R_1$) smaller than 40% of the internal radius (R) of the bundle wrapper (7), and a more or less annular peripheral zone between the central zone and the outer edge of the flow distribution baffle (14). In the central zone (15) the openings (17) for the passage of tubes and feedwater in the flow distribution baffle have a cross section ($S_1$), the cross-sectional area of which is greater than the cross-sectional area of the cross section ($S_2$) of the openings (8) for the passage of tubes and feedwater in the peripheral zone. The total surface area for the passage of feedwater in the peripheral zone (16) is greater than the total surface area for the passage of water in the central zone (15).

11 Claims, 5 Drawing Sheets

STEAM GENERATOR COMPRISING A FLOW DISTRIBUTION BAFFLE

The invention relates to a steam generator, particularly a pressurized-water nuclear reactor steam generator, which comprises a baffle for distributing feedwater in the steam generator.

Pressurized-water nuclear reactors comprise steam generators which are used for heating and vaporizing the feedwater, using the heat conveyed by the water used to cool the nuclear reactor.

The steam generator comprises a shell of cylindrical overall shape arranged, in service, with its axis vertical, and in which the feedwater is heated up and turned into steam. The nuclear reactor cooling water is made to flow through the steam generator inside the tubes of a bundle arranged inside a bundle wrapper which is fixed in a coaxial configuration inside the steam generator shell. Each of the tubes of the bundle generally comprises two straight legs, the ends of which are each crimped into an opening passing through a tube plate fixed transversely inside the steam generator shell, that is to say in an arrangement at right angles to the axis common to the shell and to the bundle wrapper of the steam generator, which constitutes the axis of the steam generator.

With the shell, the bundle wrapper of the steam generator delimits an annular space extending in the vertical axial direction of the steam generator, and the steam generator comprises means for introducing and distributing water into the upper part of the annular space. In addition, the bundle wrapper has a lower edge located a certain distance above the top face of the tube plate, so that the feedwater introduced into the upper part of the annular space flows first of all from the top downwards in the annular space, then enters the bundle wrapper via the opening formed between the lower part of the bundle wrapper and the tube plate to then flow from the bottom upwards inside the bundle wrapper in contact with the exterior surface of the tubes through which the nuclear reactor cooling water is circulated.

The feedwater is thus gradualy heated up and turned into steam as it flows in contact with the tubes of the bundle.

The steam obtained at the exit of the steam generator is sent into the nuclear power station turbine and is then recovered in the form of condensate which is recycled through the secondary circuit of the steam generator through which the feedwater flows. As it flows through the secondary circuit and through the steam generator, the feedwater becomes laden with solid matter such as oxides in the form of particles in suspension in the feedwater. These particles have a tendency to become deposited in those zones of the secondary circuit in which the feedwater flows at low speed. In particular, this suspended matter is liable to become deposited on the top face of the tube plate, which produces a deflection of the streams of feedwater coming from the peripheral annular space, so as to direct the feedwater from the periphery towards the central part of the steam generator and so as to gradually direct the streams of water in the vertical and upward direction, in contact with the tubes of the bundle.

The particles of suspended matter tend to be deposited in certain zones of the tube plate in which the flow speeds are the lowest, particularly in the central part of the tube plate.

The tubes of the bundle each of which comprises two straight legs are held inside the wrapper by transverse tube support plates, that is to say plates which are at right angles to the axis of the wrapper and spread out in the axial direction of the steam generator, so that the straight legs of the tubes, which legs are engaged in the openings passing through the tube support plates are held parallel to the axis of the steam generator and arranged in grid configurations in the transverse planes of the wrapper. The openings passing through the tube support plates are made in such a way as to be able, on the one hand, to hold the tubes of the bundle in transverse directions and, on the other hand, to allow feedwater to pass through the successive tube support plates, in contact with the tubes of the bundle.

To limit the zones at which the feedwater flows at low speed in contact with the tube plate, which are zones at which matter in suspension in the feedwater is potentially deposited, it has been proposed that a baffle for distributing the flow of feedwater be arranged in the bottom part of the bundle wrapper, this baffle having, like the tube support plates, openings for the passage of tubes of the bundle and being made in such a way as to encourage the flow of feedwater over the tube plate, particularly from the periphery towards the central part of the bundle. For that, the baffle for distributing the flow of feedwater may be made in such a way as to have a circular hole in its central part, and arranged at a well-defined height above the tube plate.

The two legs of each of the tubes of the bundle are fixed by crimping and welding their ends into the holes passing through the tube plate arranged in a grid structure similar to the grid of the openings in the tube support plates. The holes passing through the tube plate are distributed on each side of a hole-free central zone, so that an empty space or central tube lane is formed inside the bundle, vertically in line with that zone of the tube plate which has no holes, and occupies a diametral zone of the tube plate.

To prevent a high flow rate of feedwater from flowing down the steam generator tube lane, it has been proposed that blocking-off devices be placed inside the tube lane to force the feedwater towards the zones occupied by the tubes of the bundle.

In the case of devices such as those described, the openings for the passage of tubes passing through the tube support plates and the holes passing through the flow distribution baffle are made by piercing and/or broaching and may have a cross section of threelobed or four-lobed shape, that is to say a cross section which allows them to take and hold a tube of the bundle in a central part, extended radially by three or four lobes which allow the cooling water to pass around the tube.

The use of a flow distribution baffle like the one described above therefore encourages a flow of feedwater in which a substantial proportion of the feedwater which is directed towards the central part of the tube bundle passes through the flow distribution baffle via its central opening, at an appreciably higher speed than in the peripheral zone of the baffle. This use of a flow distribution baffle with a central hole makes it possible to limit the deposits on the tube plate but on the other hand may encourage the matter in suspension to be carried along in the feedwater towards those zones of the tube bundle which are located above the flow distribution baffle and towards the tube support plates.

To limit as far as possible the extent to which suspended matter is carried along in the feedwater towards the upper parts of the tube bundle, a solution that makes it possible to obtain a more uniform distribution of speeds throughout the lower part of the steam generator has been sought.

The object of the invention is therefore to provide a steam generator, particularly a pressurized-water nuclear reactor steam generator, used for heating and vaporizing the feedwater flowing in thermal contact with a hot fluid circulated to the inside of tubes of a bundle, each having two straight legs, comprising a shell of cylindrical overall shape, a tube plate fixed in an arrangement that is perpendicular to the axis of the shell and pierced with openings to take the ends of the straight legs of the tubes of the bundle, a bundle wrapper arranged coaxially inside the shell and inside which is placed the bundle of tubes, the straight legs of which are parallel to the axis of the steam generator common to the shell and to the bundle wrapper and a lower edge of which is arranged above the tube plate, a number of transverse plates which are mutually parallel and parallel to the tube plate, fixed in arrangements which are spread out in the direction of the axis of the steam generator, inside the bundle wrapper and through which there pass openings for the passage of each of the legs of the tubes of the bundle, forming spaces for the flow of feedwater and means for introducing feedwater into an annular space between the shell and the bundle wrapper above the tube plate so that the feedwater first of all flows from the top downwards in the annular space then flows from the bottom upwards in the bundle wrapper in contact with the tubes of the bundle after having passed under the lower edge of the bundle wrapper, this steam generator making it possible to obtain a uniform distribution of speeds throughout the lower part of the steam generator.

To this end, the transverse plate arranged closest to the tube plate, and known as a flow distribution baffle comprises, in a substantially circular central zone having as its axis the axis of the steam generator and having a radius at most equal to 40% of the radius of the transverse plate substantially equal to the internal radius of the bundle wrapper, openings for the passage of tubes for feedwater and having a first cross section $S_1$ and, in a second zone at the periphery of the central zone, openings for the passage of tubes and feedwater having a second cross section $S_2$, the cross-sectional area of which is smaller than the cross-sectional area of the first cross section $S_1$.

As a preference, the central tube lane of the steam generator has no blocking-off devices restricting the circulation of feedwater, and this makes it easier to clean the tube plate on which particles of matter suspended in the feedwater are likely to be deposited, because of the low flow speeds in contact with certain zones of the tube plate, these low speeds being due to the absence of circular holes for the passage of feedwater in the central zone of the flow distribution baffle.

As a preference, the total surface area for the passage of feedwater through the flow distribution baffle is greater in the peripheral zone than in the central zone even though the individual cross sections of the openings for the passage of tubes is greater in the central zone than in the peripheral zone. In order to allow a good understanding of the invention, a steam generator comprising a flow distribution baffle according to the invention will now be described by way of example with reference to the appended figures.

FIG. 1 shows a pressurized-water nuclear reactor steam generator denoted by the general reference 1, comprising a shell 2 of cylindrical overall shape arranged, in service with its axis vertical.

Figure 1:
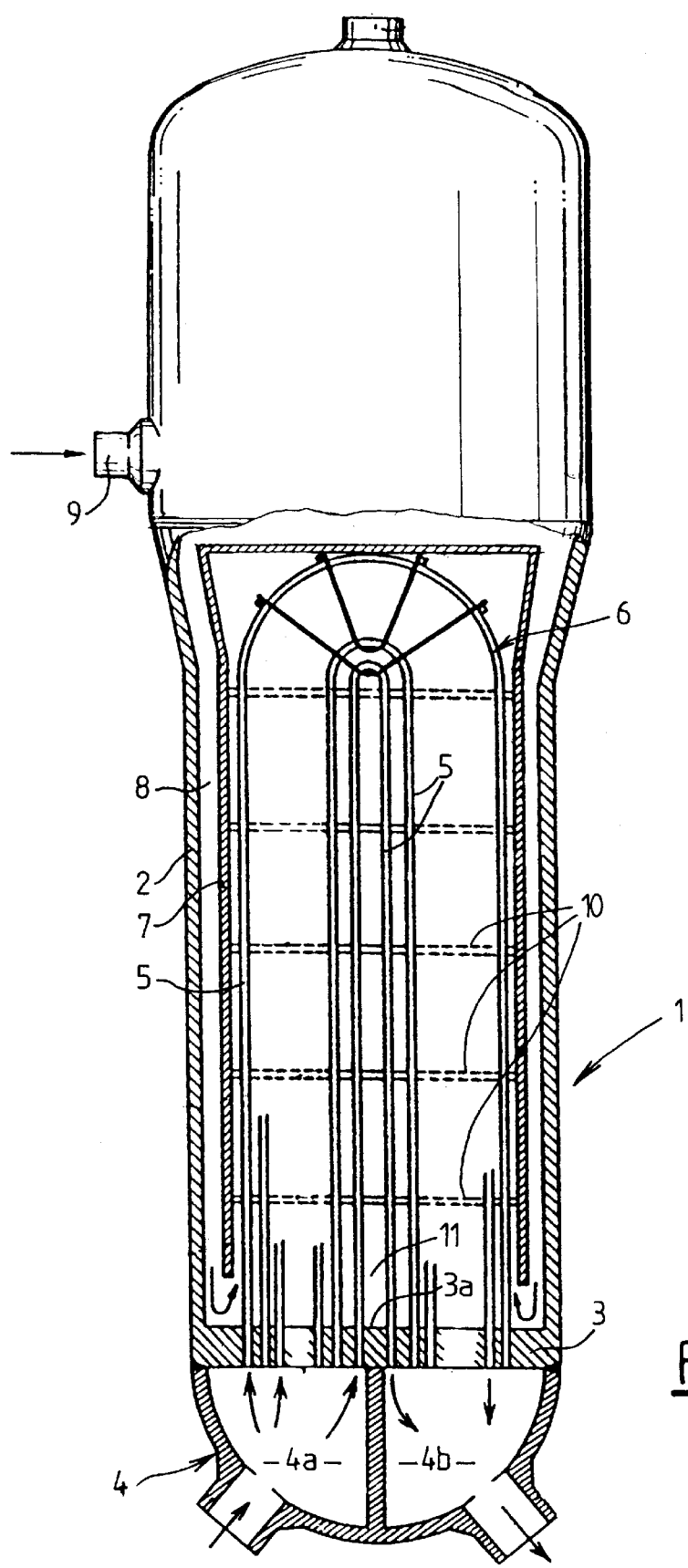
FIG. 1 is a view in part section of a steam generator of a pressurized-water nuclear reactor.

At its lower part, the shell 2 is secured to a transversely directed tube plate 3, that is to say a plate directed at right angles to the axis of the shell 2. Passing through the tube plate 3 are openings, in each of which the end part of a straight leg of a tube of the bundle 6 of bent U-shaped tubes is engaged.

A waterbox 4 made in two parts 4a and 4b, separated by a partition, is fixed under the tube plate 3.

The openings for the engagement and attachment of the ends of the straight legs of the tubes 5 passing through the tube plate 3 are spread out on each side of a central zone 3a of the tube plate 3 which has no openings. Each of the tubes 5 of the bundle has a straight leg, the end of which is fixed into an opening situated on one side of the central part 3a of diametral direction of the tube plate 3, and a second straight leg, the end part of which is fixed into an opening passing through the tube plate 3, on the other side of the central diametral part 3a.

The openings for the attachment of the end parts of the tubes 5, which are located on one side of the central zone 3a and of the straight legs of the corresponding tubes open into the inlet compartment 4a of the waterbox, whereas the openings passing through the tube plate 3 and located on the other side of the diametral central zone and the straight legs of the corresponding tubes 5 open into the outlet compartment 4b of the waterbox.

When the steam generator is in operation, high-temperature reactor cooling water from the vessel containing the reactor core is introduced into the inlet compartment 4a and distributed into each of the tubes 5 of the bundle. Cooling water flows through the tubes 5 along their entire length, to re-emerge in the outlet compartment 4b of the waterbox.

The bundle 6 of tubes 5 belonging to the steam generator is arranged inside a bundle wrapper 7 of cylindrical overall shape arranged coaxially inside and in the smaller-diameter lower part of the shell 2 of the steam generator. The axis which is common to the shell 2 and the bundle wrapper 7 also constitutes the axis of the bundle 6. This axis will be known as the axis of the steam generator arranged, in service, in the vertical direction.

The bundle wrapper 7 has a lower edge arranged a certain distance above the top face of the tube plate 3.

The shell 2 and the bundle wrapper 7 between them delimit an annular space 8 which at its lower part communicates with the internal space of the bundle wrapper 7 containing the bundle 6 of tubes 5 of the steam generator.

Feedwater, or secondary fluid, is introduced into the annular space 8 when the steam generator is operating, via a nozzle 9 and a feedwater distribution device arranged above the upper part of the annular space 8.

The tubes 5 of the bundle 6 are held transversely inside the bundle wrapper 7 by transverse tube support plates 10 spread out in the axial direction of the bundle wrapper 7.

Passing through the tube support plates 10 are grids of openings, in a configuration similar to the openings in which the ends of the straight legs of the tubes 5 passing through the tube plate 3 are engaged. The openings for the passage of the tubes in the tube support plates 10 form, around the tubes which are held transversely by edges of the openings, passages for the steam generator feedwater.

Vertically in line with the central zone 3a of the tube plate 3 which has no openings for the engagement and attachment of ends of tubes 5, an empty space 11 or central tube lane is formed inside the steam generator bundle 6.

When the steam generator is in operation, as indicated earlier, high-temperature nuclear reactor cooling water flows along inside the tubes 5 of the bundle and feedwater is introduced via the nozzle 9, so that it is distributed in the upper part of the annular space 8.

The water introduced into the annular space 8 flows from the top downwards in this annular space until it comes level with the annular opening formed between the lower edge of the bundle wrapper 7 and the top face of the tube plate 3 and allowing the feedwater to pass into the bundle wrapper 7 where the feedwater flows in a more or less vertical direction and from the bottom upwards, some of the feedwater being directed from the peripheral part towards the central part of the bundle.

The feedwater flowing in contact with the tubes of the bundle heats up and turns into steam, to emerge in the form of steam at the upper part of the shell 2 of the steam generator.

The transverse plate 10 located closest to the tube plate 3, that is to say the plate 10 placed immediately above the tube plate 3, may be made in the form of a flow distribution baffle which encourages better circulation in the central part of the bundle and limits the deposition of solid matter in suspension in the feedwater on the top face of the tube plate 3 as far as possible.

Figure 2:
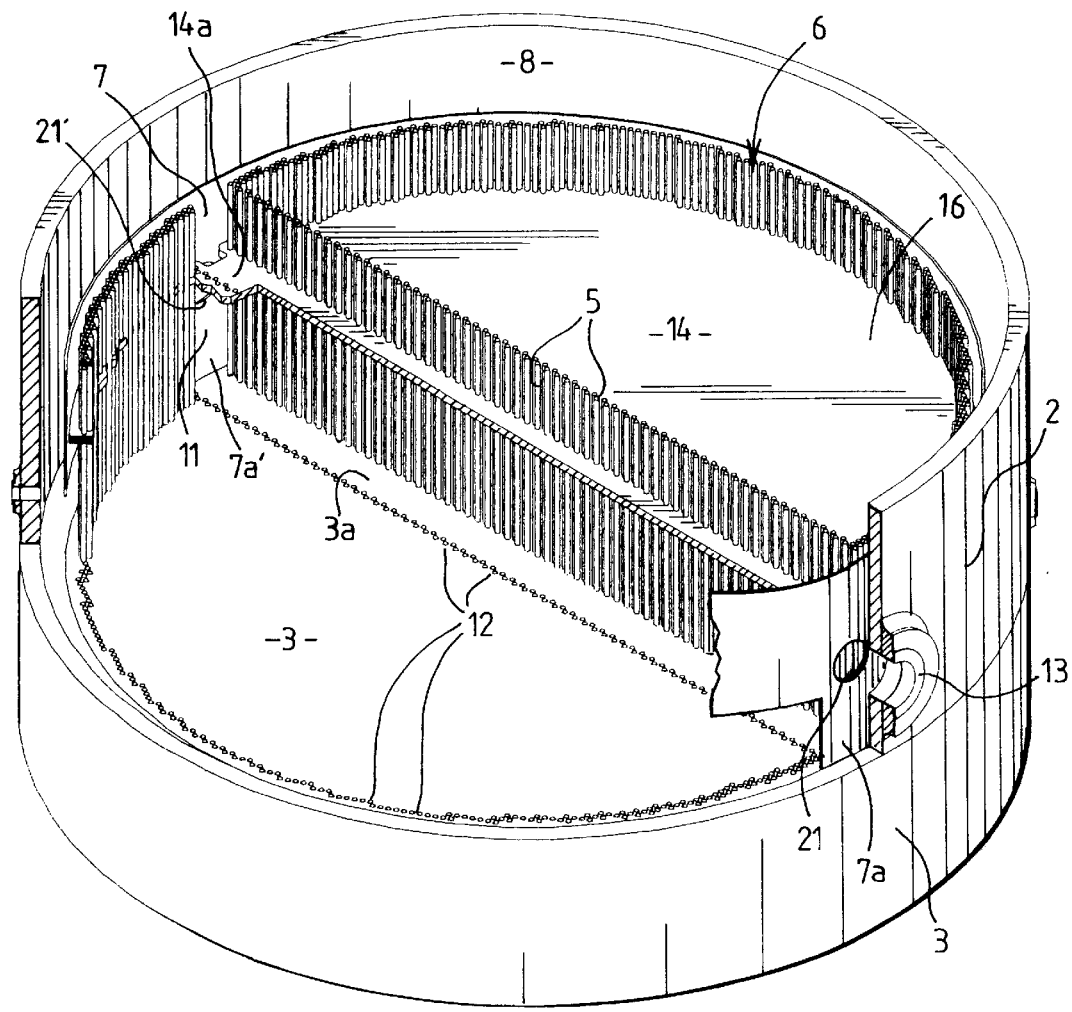
FIG. 2 is a part view in exploded perspective of the lower part of a steam generator comprising a flow distribution baffle according to the invention.
Figure 3:
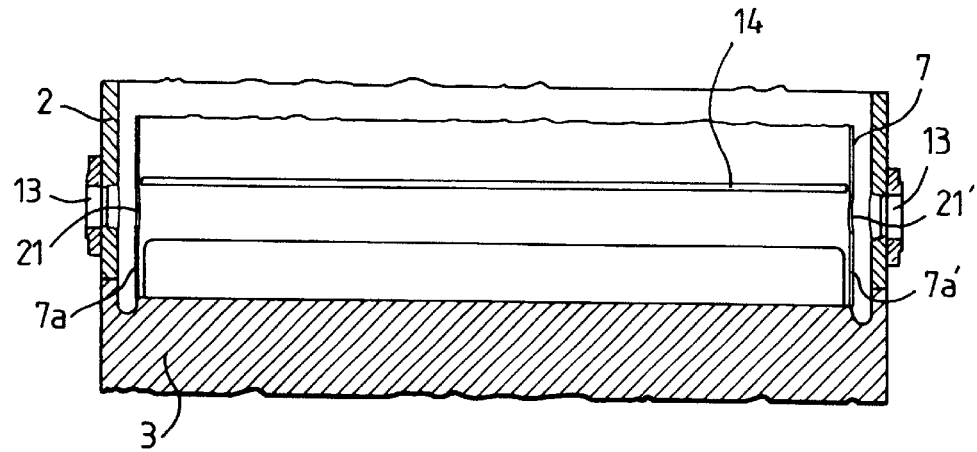
FIG. 3 is a view in axial section along the central tube lane of the lower part of the steam generator depicted in FIG. 2.

In the case of a steam generator according to the invention, the lower part of the bundle of which has been depicted, in particular, in FIGS. 2 and 3, the plate fixed inside the bundle wrapper and arranged immediately above the steam generator tube plate may be produced in the form of a baffle which distributes and regulates the flow of feedwater to allow the speeds of the cooling water in the bottom part of the steam generator to be distributed uniformly.

Those elements in FIG. 1 and in FIGS. 2 and 3 which correspond are denoted by the same reference symbols.

FIGS. 2 and 3 depict the lower part of a steam generator according to the invention, in the vicinity of the tube plate 3 secured to the lower part of the shell 2.

Passing through the tube plate 3 are openings 12 for attaching the end parts of the straight legs of the tubes 5 of the steam generator bundle 6.

In a diametrally directed central part 3a, the tube plate 3 has no openings for attaching end parts of legs of tubes 5, the openings 12 being arranged in the form of a grid of openings, on each side of the diametral central zone 3a.

The zone empty of tubes above the diametral central zone 3a constitutes the tube lane 11 of the steam generator.

At the ends of the central tube lane 11, the shell 2 has circular openings constituting handholes 13 to allow inspections and interventions inside the steam generator bundle.

The steam generator according to the invention, as depicted partially in FIGS. 2 and 3, comprises a set of tube support plates fixed transversely inside the bundle wrapper 7 and spread out in the axial direction of the bundle.

The grids of openings for the passage of the tubes of the bundle pass through the transverse tube support plates in arrangements similar to the grid of openings 12 passing through the tube plate 3. The openings for the passage of tubes in the transverse plates transversely hold the tubes in place and have passages for the steam generator feedwater, around each of the tubes engaged in an opening in a transverse plate.

According to the invention, the transverse plate 14 located closest to the tube plate 3, that is to say the transverse plate 14 located lowest down inside the bundle wrapper 7, is made in the form of a flow distribution baffle which will be described hereinafter and which makes it possible to obtain a uniform distribution of the feedwater speeds and flow rates in the bottom part of the steam generator.

The flow distribution baffle 14 is arranged above the tube plate 3 at a distance which may be between 450 mm and 550 mm in the case of a bundle of a steam generator of the order of 10 m tall.

Figure 4:
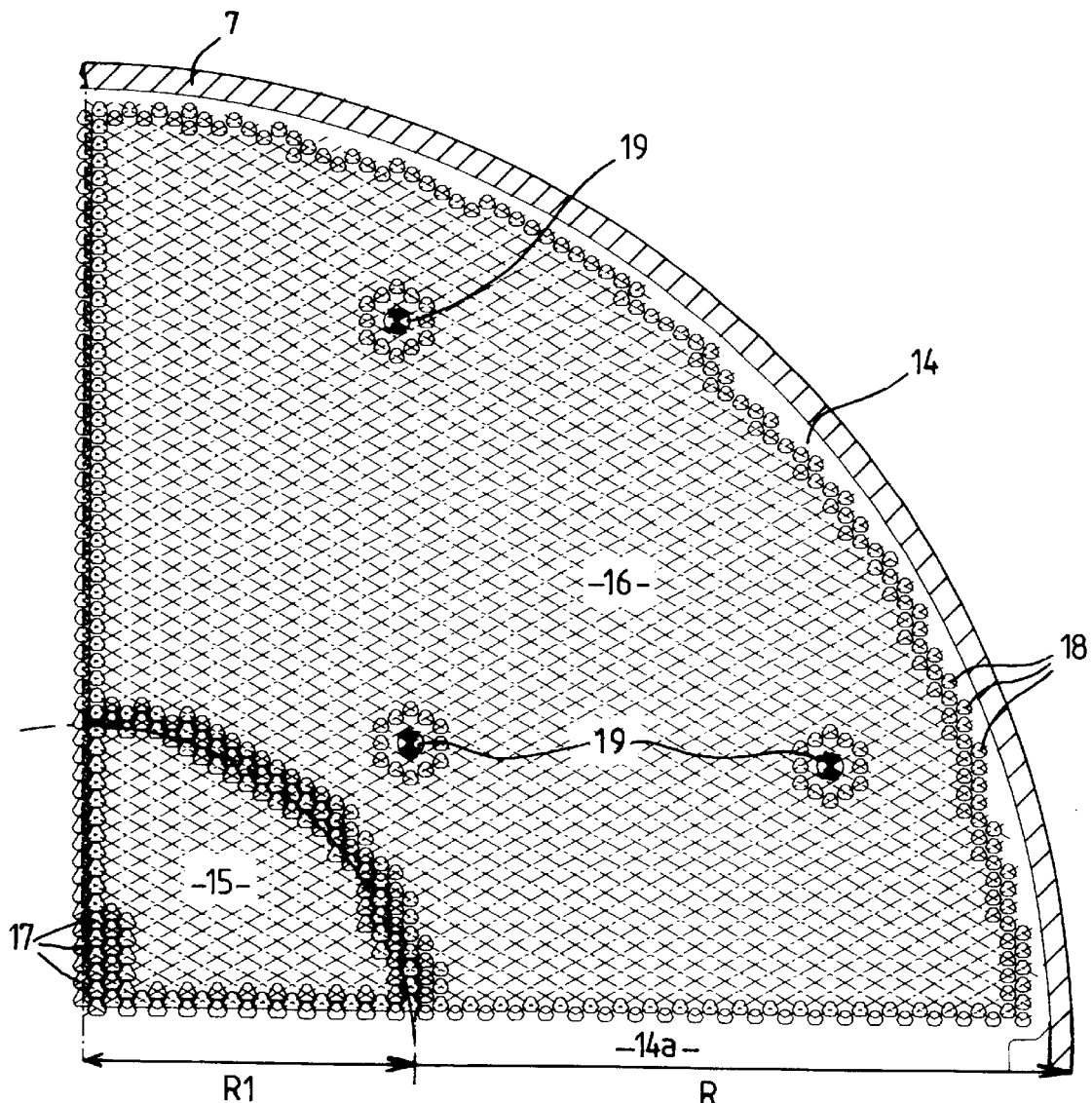
FIG. 4 is a plan view of one quadrant of the flow distribution baffle of the steam generator depicted in FIGS. 2 and 3.

As can be seen in FIG. 4, the flow distribution baffle 14 comprises openings for the passage of tubes distributed across its entire surface area except for a diametrically directed zone 14a arranged along the central tube lane 11, in line with the zone 3a of the tube plate 3. In particular, the flow distribution baffle 14 has no circular central openings for the passage of water, making it possible to avoid or limit the deposits on the tube plate.

The flow distribution baffle 14 has two zones in which the openings for the passage of tubes and feedwater have different shapes and cross sections.

In a first zone 15 of more or less circular shape having, as its axis, the axis of the bundle wrapper and of the steam generator, the openings 17 passing through the flow distribution baffle have a first cross section $S_1$, and in the second, peripheral, zone 16 lying between the circular outer limit of the first zone 15 and the outer edge of the baffle 14, second openings 18 pass through the baffle 14 and have a second cross section $S_2$, the cross-sectional area of which is smaller than the cross-sectional area of the cross section $S_1$ of the openings 17.

In actual fact, the first central zone 15 has two parts of more or less semicircular shape separated by the diametral zone 14a of the flow distribution baffle 14 in which the flow distribution baffle has no openings for the passage of tubes or water. Likewise, the peripheral zone 16 consists of two parts separated by the diametral zone 14a of the flow distribution baffle. As mentioned hereinabove, the flow distribution baffle 14 has no circular central opening to encourage the flow of cooling water, the central part of the baffle comprising part of the diametral zone 14a which has no openings for the passage of tubes passing through it.

The peripheral zone in its entire surface outside of the diametral zone 14a has openings through which tubes can pass, these openings being distributed in the grid configuration of the tubes of the bundle.

Certain positions 19 of openings 18 are used for the passage or attachment of throughbolts used to suspend the transverse plates, including the flow distribution baffle 14, inside the bundle wrapper 7.

As can be seen in FIGS. 2 and 3, the bundle wrapper 7 has extensions 7a and 7'a in the axial direction at the ends of the central tube lane 11 of the steam generator bundle, which lane is delimited, at its lower part, by the diametral zone 3a of the tube plate 3 and, at its upper part, by the diametral zone 14a of the flow distribution baffle 14, the diametral zones 3a and 14a being free of openings for the passage of tubes. The central tube lane 11 is also delimited laterally by the two rows of tubes of the bundle, which rows consist of the straight legs of the tubes 5 which have the smallest bend radius, known as the tight U-bend tubes. Finally, the central tube lane is delimited by the extensions 7a and 7'a of the bundle wrapper 7 which extend the bundle wrapper opposite the central tube lane practically as far as the top face of the tube plate 3. The remaining part of the lower edge of the bundle wrapper 7 is arranged, as in the case of steam generators of the prior art, a certain distance above the top face of the tube plate 3, to allow the passage of the steam generator feedwater flowing from the top downwards through the annular space 8.

The extensions 7a and 7'a of the bundle wrapper 7 prevent the feedwater from easily entering the central tube lane 11 which is free of tubes 5 and of devices for blocking off the circulation of water.

Openings 21 and 21', aligned axially with the handholes 13 in the shell 2 pass through the bundle wrapper 7 to provide access to the central tube lane 11, in spite of the presence of the extensions 7a and 7'a of the bundle wrapper. Thus, in particular, the handholes 13 and the corresponding openings 21 and 21' can be used to introduce one or more lances into the central tube lane 11 to clean the top face of the tube plate 3, the introduction and movement of the lances not being impeded by any obstacle obstructing the central tube lane 11. This ease with which the tube plate can be cleaned is of great benefit in the case of the use of a flow distribution baffle 14 which has no circular hole at its central part. This is because, as explained earlier, in such cases there is a greater tendency for matter in suspension in the feedwater to be deposited on the tube plate because of the presence of low-speed zones above the tube plate 3.

Figure 5:
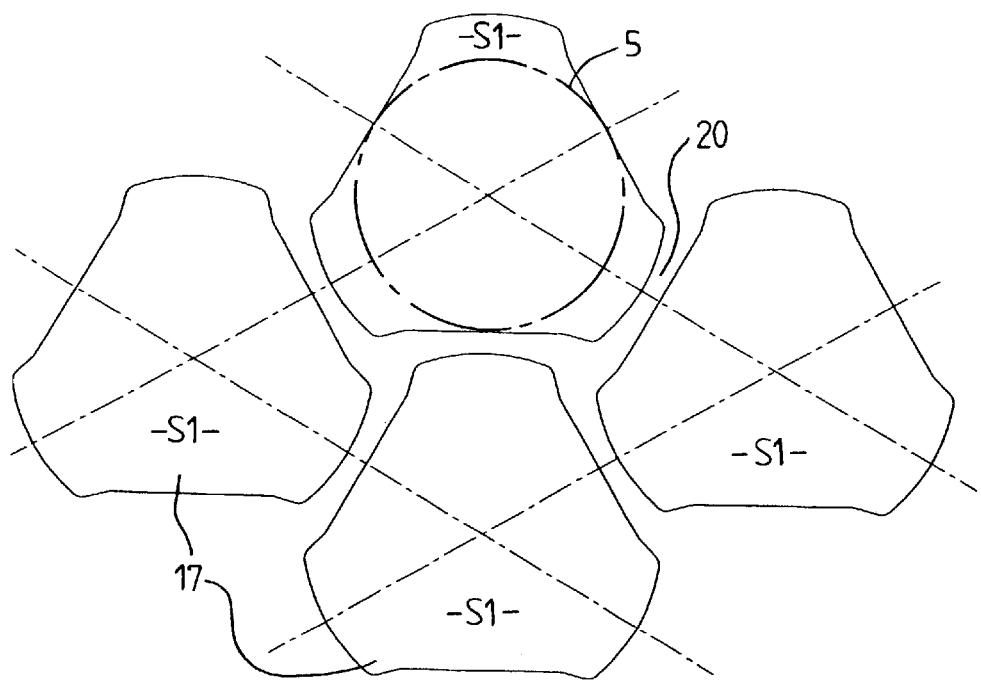
FIG. 5 is a view on a larger scale of openings passing through the central part of the flow distribution baffle of the steam generator depicted in FIG. 4.
Figure 6:
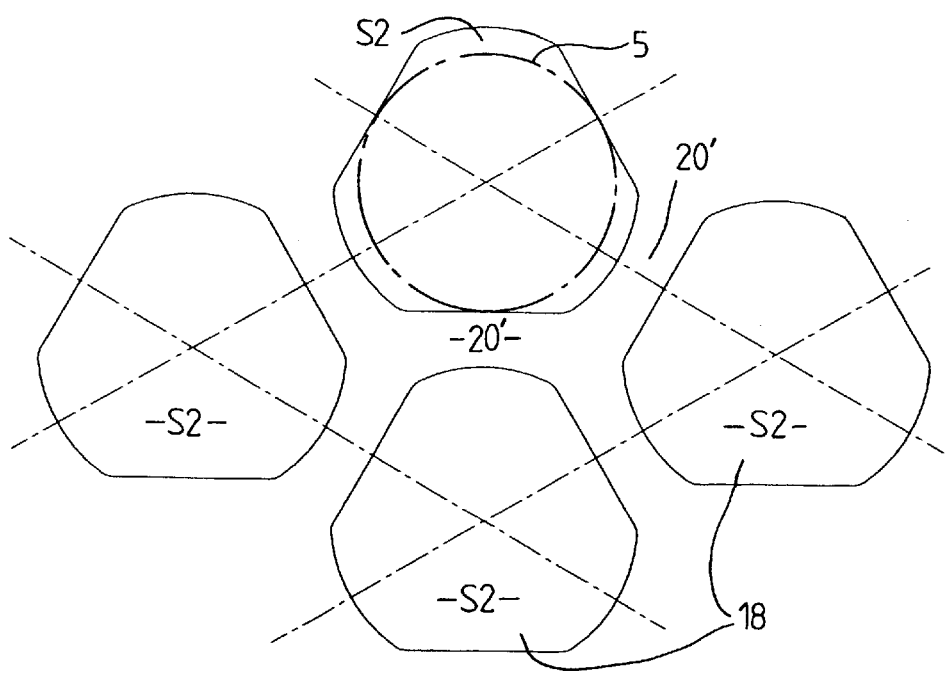
FIG. 6 is a view on a larger scale of openings passing through the peripheral part of the flow distribution baffle of the steam generator depicted in FIG. 4.

FIGS. 5 and 6 depict, on a larger scale, openings 17 passing through the flow distribution baffle 14 in the central zone 15, and openings 18 passing through the flow distribution baffle 14 in its peripheral zone 16, respectively.

The openings 17 and 18 are arranged in a triangular-mesh grid, the centres of three adjacent openings being placed at the vertices of an equilateral triangle.

The openings 17 and 18 are of three-lobed shape, these openings each having three radially-directed lobes extending towards the outside of the opening.

Each of FIGS. 5 and 6 depicts the external contour of the cross section of a tube 5 of the steam generator, inside a penetration opening in the flow distribution baffle. The three lobes of the corresponding openings constitute sections for the passage of steam generator feedwater through the flow distribution baffle 14 at the periphery of the tube 5.

As can be seen from comparing FIGS. 5 and 6, the lobes for the passage of water in the openings 17 of the central part 15 of the flow distribution baffle have a larger dimension in the radial direction than the lobes for the passage of water in the openings 18 in the peripheral part 16 of the flow distribution baffle. The lobes for the passage of water in the openings 17 are extended outwards and circumferentially enlarged, because they have lateral edges the end parts of which diverge angularly from the generally straight edges of the opening.

Because of the presence of larger-sized lobes for the passage of water, the openings 17 have a cross section $S_1$, the cross-sectional area of which is greater than the cross-sectional area of the cross section $S_2$ of the openings 18 passing through the peripheral part of the baffle 14.

For example, in the case of a steam generator in which the tubes have an external cross section of the order of 285 mm$^2$, the openings 17 in the central part of the flow distribution baffle may have a cross section $S_1$, the cross-sectional area of which is of the order of 540 mm$^2$, and openings 18 passing through the peripheral part 16 with a cross section $S_2$, the cross-sectional area of which is of the order of 435 mm$^2$.

Thus, in the central zone 15, the empty space for the passage of water for each of the openings 17, that is to say the sum of the three water passage cross sections of each of the openings is about 250 mm$^2$, whereas this cross section for the passage of water is only about 150 mm$^2$ per opening 18, in the peripheral zone 16.

However, because the more or less circular central zone has a radius $R_1$ which, for example, is only one-third of the radius R of the tube plate, or lower, the total surface area for the passage of fluid in the peripheral zone of the flow distribution baffle is 4 to 5 times greater than the cross section for the passage of feedwater in the central zone 15.

More generally, the central zone has a radius which is at most equal to 40% of the radius of the flow distribution baffle, that is to say also 40% of the internal radius of the bundle wrapper 7 in which the flow distribution baffle is housed with practically no clearance.

As a preference, the radius $R_1$ of the central zone will be chosen so that it is between ¼ and ⅓ of the radius R of the flow distribution baffle.

In all events, the total cross section for the passage of water in the peripheral zone is appreciably greater than the cross section for the passage of water in the central part of the steam generator.

Figure 7:
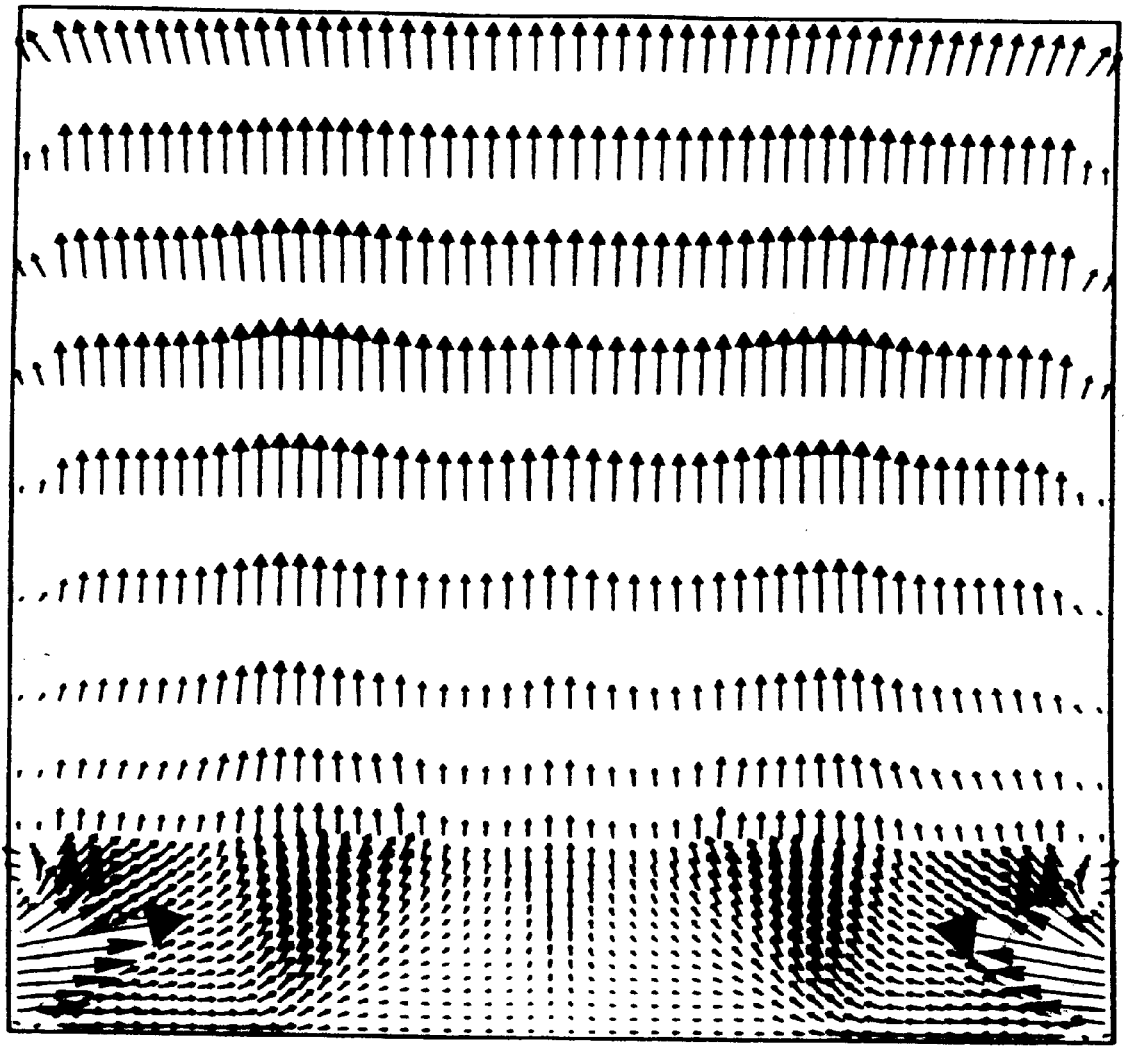
FIG. 7 is a diagram of the distribution of feedwater speeds in the lower part of the steam generator according to the invention.

This arrangement, which allows a uniform distribution of the feedwater speeds and flow rate in the bottom part of the steam generator, as depicted in FIG. 7, may lead to an increase in the amount of deposits in the central zone of the tube plate, by comparison with the device of the prior art.

As explained earlier, the tube plate can be cleaned very easily because of the absence of blocking-off devices in the central tube lane.

The openings 17 and 18 in the central part and in the peripheral part of the flow distribution baffle may be produced by piercing and preferably by piercing and broaching, so as to obtain openings of perfectly constant shape and size.

As can be seen in FIGS. 5 and 6, the remaining parts of the flow distribution baffle between the openings 17 or 18, and which are denoted respectively by the references 20 and 20', have different widths in the central zone and in the peripheral zone.

The remaining parts of the flow distribution baffle, denoted by the reference 20, have a smaller width in the central part 15 of the flow distribution baffle than in the peripheral part because of the greater size of the openings for the passage of tubes in the central part.

The generator according to the invention therefore makes it possible to obtain a uniform distribution of the water flow streams in the bottom part of the steam generator and this, in particular, makes it possible to avoid excessive amounts of particles in suspension being carried along in the feedwater over the flow distribution baffle in the upper part of the steam generator bundle and over the tube support plates which hold the tubes of the bundle in place. A greater deposit of suspended matter on the tube plate presents no major disadvantage since it is easily possible to clean the top surface of the tube plate. By contrast, cleaning the tube support plates in the upper parts of the bundle is an operation which is very difficult to perform.

The invention is not restricted to the embodiment described.

Thus, the openings in the flow distribution baffle in the central part and in the peripheral part of this baffle may have shapes other than those described and depicted, for example may have four-lobed shapes; these openings may also be arranged in a grid pattern different from a grid with a triangular mesh and, for example, may be arranged in a square-mesh grid pattern.

The invention applies to tubes of cross sections different from those mentioned in the description.

The invention applies not only to steam generators for pressurized-water nuclear reactors but also to any steam generator in which a secondary fluid is turned into steam by the heat supplied by a primary fluid flowing through tubes of a bundle.

The invention could also be applied to heat exchangers in which a primary fluid and a secondary fluid are circulated.

What is claimed is:

1. Steam generator, particularly a pressurized water nuclear reactor steam generator, used for heating and vaporizing the feedwater flowing in thermal contact with a hot fluid circulated to the inside of tubes (5) of a bundle (6), each having two straight legs, comprising a shell (2) of cylindrical overall shape, a tube plate (3) fixed in an arrangement that is perpendicular to the axis of the shell (2) and pierced with openings (12) to take the ends of the straight legs of the tubes (5) of the bundle (6), a bundle wrapper (7) arranged coaxially inside the shell (2) and inside which is placed the bundle of tubes (5), the straight legs of which are parallel to the axis of the steam generator and a lower edge of which is arranged above the tube plate (3), a number of transverse plates (10) which are mutually parallel and parallel to the tube plate (3), fixed in arrangements which are spread out in the direction of the axis of the steam generator, inside the bundle wrapper (7) and through which there pass openings for the passage of each of the legs of the tubes (5) of the bundle (6), forming spaces for the flow of feedwater and means (9) for introducing feedwater into an annular space (8) between the shell (2) and the bundle wrapper (7) above the tube plate (3) so that the feedwater first of all flows from the top downwards in the annular space (8) then flows from the bottom upwards in the bundle wrapper (7) in contact with the tubes (5) of the bundle (6) after having passed under the lower edge of the bundle wrapper (7), characterized in that the transverse plate (14) arranged closest to the tube plate, and known as a flow distribution baffle (14) comprises, in a substantially circular central zone having as its axis the axis of the steam generator and having a radius at most equal to 40% of the radius of the transverse plate substantially equal to the internal radius of the bundle wrapper (7), openings (17) for the passage of tubes (5) and feedwater and having a first cross section ($S_1$) and, in a second zone (16) at the periphery of the central zone (15), openings (18) for the passage of tubes (5) and feedwater having a second cross section ($S_2$), the cross-sectional area of which is smaller than the cross-sectional area of the first cross section ($S_1$).

2. Steam generator according to claim 1, characterized in that the radius ($R_1$) of the central zone (15) of the flow distribution baffle (14) is between ¼ and ⅓ of the radius (R) of the flow distribution baffle.

3. Steam generator according to claim 1 characterized in that the total surface area for the passage of feedwater through the openings (18) in the peripheral zone (16) is greater than the total surface area for the passage of feedwater through the openings (17) in the central zone (15).

4. Steam generator according to claim 3, characterized in that the total surface area for the passage of water in the peripheral zone is about four to five times greater than the surface area for the passage of water in the central zone (15).

5. Steam generator according to claim 1 comprising a bundle of tubes (5), the external cross section of which has a cross-sectional area of about 285 $mm^2$, characterized in that the openings (17) in the central part (15) of the flow distribution baffle (14) have a cross-sectional area of about 540 $mm^2$ and in that the openings (18) in the peripheral part (16) of the flow distribution baffle (14) have a cross-sectional area of about 435 $mm^2$, an empty space for the passage of feedwater measuring about 250 $mm^2$ being left at the periphery of each of the tubes (5) engaged in a central opening (17), and an empty space for the passage of water measuring about 150 $mm^2$ being left around each of the tubes (5) engaged in an opening (18) in the peripheral part (16) of the flow distribution baffle (14).

6. Steam generator according to claim 1 characterized in that the openings (17, 18) for the passage of tubes in the central part (15) and in the peripheral part (16) of the flow distribution baffle (14) have cross sections for the passage of water, or lobes, around the tubes (5) of the bundle (6) extending radially towards the outside of the openings (17, 18), the lobes of the openings (17) in the central part (15) of the flow distribution baffle (14) having a dimension in-the radial direction which is greater than the dimension in the radial direction of the lobes of the openings (18) in the peripheral part (16) of the flow distribution baffle (14).

7. Steam generator according to claim 1 characterized in that the openings (17, 18) in the flow distribution baffle (14) are made by piercing and broaching.

8. Steam generator according to any claim 1 characterized in that the flow distribution baffle is located at a distance to the tube plate of between 450 mm and 550 mm in the case of a bundle of a steam generator approaching 10 m tall.

9. Steam generator according to claim 1 comprising a tube plate with a central zone (3a) directly across the diameter with no openings for taking tubes (5) of the bundle, characterized in that the flow distribution baffle (14) comprises a diametral central zone (14a) with no openings (17, 18) for the passage of tubes (5) and feedwater, so that an empty space known as a central tube lane (11) is delimited inside the bundle wrapper (7) between the diametral central zone (3a) of the tube plate (3), the diametral central zone (14a) of the flow distribution baffle (14) and two rows of straight legs of tubes (5) of the steam generator bundle (6), which legs are engaged in receiving openings (12) in the tube plate (3) which are adjacent to the diametral central zone (3a) which has no receiving openings.

10. Steam generator according to claim 9, characterized in that the bundle wrapper (7) has extensions in the axial direction (7a, 7'a) with respect to the lower edge of the bundle wrapper, more or less as far as the top face of the tube plate (3) opposite the two ends of the central tube lane (11) in the diametral direction.

11. Steam generator according to claim 10, comprising a shell which has handholes which provide access to the central tube lane (11) of the diametral ends of the central tube lane (11), characterized in that the bundle wrapper (7) has holes (21, 21') for accessing the central tube lane, which are axially aligned with the handholes (13).

* * * * *